July 16, 1929.   D. KERN   1,721,223
SIGNAL WINDOW
Filed Sept. 24, 1928
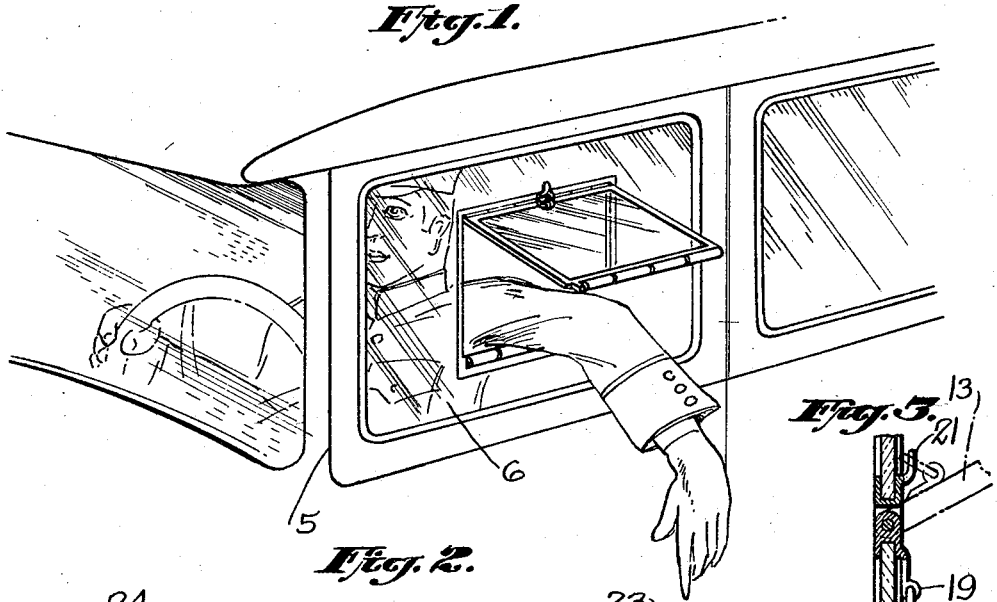
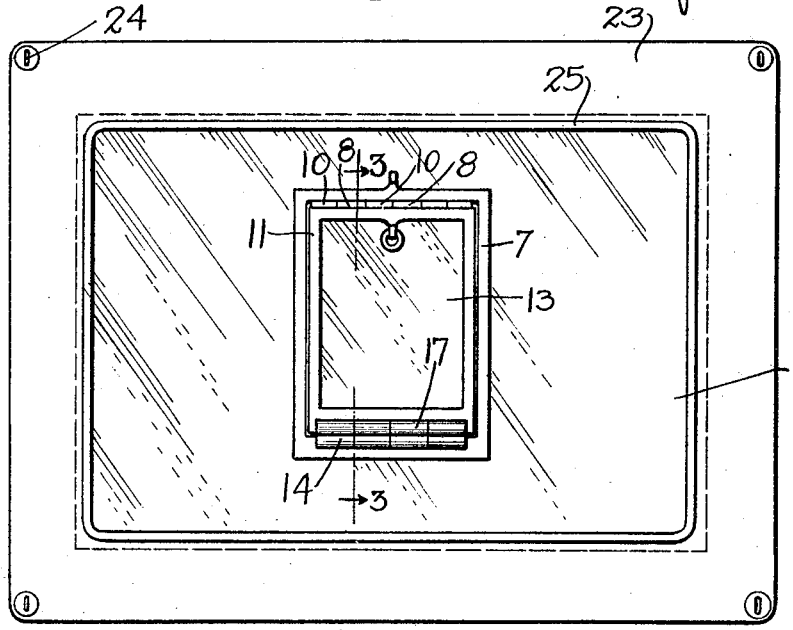
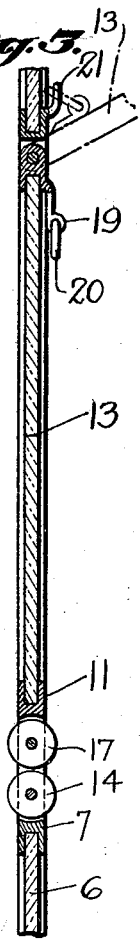
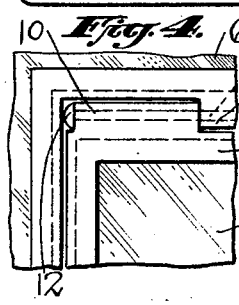
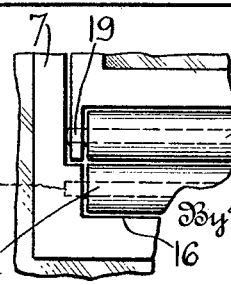
Inventor
DONALD KERN.
By His Attorney
Irving L. McCathran Patented July 16, 1929.

1,721,223

UNITED STATES PATENT OFFICE.

DONALD KERN, OF BROOKLYN, NEW YORK.

SIGNAL WINDOW.

Application filed September 24, 1928. Serial No. 307,963.

This invention relates to windows and in particular to a signalling window adapted for use in connection with an automotive vehicle.

A particular object of the invention is to provide within the regular window of an automotive vehicle adjacent the driver's seat an auxiliary or signal window which will permit the driver to push his hand through the window by pushing the auxiliary window out on its hinges to give the proper signal while driving.

A still further object of the invention is to provide an auxiliary window in connection with the main window which will provide for the ventilation, means being provided whereby the auxiliary window may be maintained in its open position so that free signalling movement of the operator's arm and ventilation of the interior of the vehicle may be had.

A still further object of the invention is to provide an automotive vehicle weather window for use in connection with open cars and the like which may be readily placed in position with suitable snap members and which in itself, is arranged to provide an auxiliary signal window, as above described.

To enable others skilled in the art to fully comprehend the underlying features of my invention that they may embody the same in the various modifications in structure and relation contemplated, a drawing depicting a preferred form has been annexed as a part of this disclosure and in such drawing, similar reference characters denote corresponding parts throughout all the views, of which, Figure 1 is a view in perspective of the forward end of a motor vehicle showing the use of my improved auxiliary window as a means for permitting the signalling and also as a ventilating means for the interior of the car.

Figure 2 is a view in elevation of a window for use in connection with an open car and having incorporated therein the auxiliary signalling window.

Figure 3 is a section taken on the line 3—3 of Figure 2 and greatly enlarged to illustrate the construction of the auxilary window.

Figure 4 is a fragmentary view of the upper corner of the signalling or auxiliary window illustrating how the same is hinged to a suitable frame carried in the main window, and Figure 5 is a view similar to Figure 4 taken at the lower corner of the auxiliary window showing how it fits snugly into the cut out portion of the main window.

Referring to the drawing in detail, 5 indicates an automotive vehicle having mounted in the body thereof and adjacent the driver's seat, a main window 6 which, as understood, is usually mounted for opening and closing movement in a vertical direction. In signalling, it has heretofore been necessary to keep this main window 6 open at all times or run the risk of accident due to the inability of the driver to signal to the car following. In order that the driver may readily signal his intended movements, I have provided in the main window 6, a central opening, which is reinforced through the medium of the frame 7, which is substantially U-shaped in cross section and which is arranged to fit about the edges of the glass in the cut out portion. This frame 7 across the top is provided with the spaced, depending portion or hinged part 8, see Figure 4, which has passed therethrough, a hinge pin 9, the free parts of the hinge pin passing through the hinge portion 10 that are formed on the upper edge of an auxiliary window frame 11. The end of the hinge pin is turned over as at 12 to prevent separation of the auxiliary window 13 from the frame 7. The lower edge of the frame 7 is arranged to accommodate a plurality of rollers 14 on a suitable shaft 15, whose ends are journalled in the ends of a suitable cut out 16 provided at the bottom edge of said frame 7. These rollers 14 are free to revolve and are arranged to cooperate with a set of rollers 17 carried on a suitable roller shaft 18 whose ends are journalled in the extended portion 19 of the auxiliary sash frame 11. This sash frame, by the way, is also substantially U-shaped in cross section and is arranged to support a glass window, otherwise known as the auxiliary window 13. The upper portion of this frame 11 at its center is provided with a suitable ring piece 19 which is arranged to accommodate the ring 20, this ring 20 being arranged to engage a suitable hook 21, formed on the upper center of the main window frame 7, whereby as illustrated in Figure 3, the auxiliary window can be held open, as indicated in outline and as shown in full lines in Figure 1, for the purpose of ventilating the interior of the vehicle.

It is quite evident that when the auxiliary window 13 is hanging in its closed position, the driver of the car may simply push the window out to signal. The rollers 14 and 17 on the bottom of the frame 7 and frame 11 respectively reduce the friction and prevent the arm or sleeve from becoming wedged between the bottom of the auxiliary window and the edge of the main window. In other words, the rollers provide a free in and out movement for the chauffeur's arm for signalling and in inclement weather, permit this signalling without undue entrance of the elements into the interior of the car.

In Figure 1, I have shown a window incorporated in the regular main window 6 of an automotive vehicle but in open cars in which no glass windows are provided, the main window 22 may be carried in a suitable curtain piece 23 which is made of leather or other suitable material and which carries the fastening element 24 at the corners thereof so that it may be positioned in its proper place in the window opening. This piece 23 is provided with a suitable opening bounded by a metallic reinforce member 25 which is arranged to accommodate the main glass pane 22 in which is provided the usual opening, as above described for the reception of the frame piece 7 in which is carried the auxiliary window. This window, of course, carries the usual rollers and is identically the same as the window described in connection with the main window 6.

It is quite evident, therefore, that I have provided an auxiliary hand signalling window which permits the operator of a vehicle to signal during inclement weather without admitting to the interior of the car, an undue amount of rain or snow and one which also may be maintained in its raised position to provide a suitable amount of ventilation.

It is also evident that my improved window can be applied to any make of motor vehicle or may be embodied in the celluloid or glass pane which is carried in storm curtains and the like.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. In a vehicle window having an opening therein, a frame in the opening, rollers in the frame, an auxiliary window hingedly connected to said frame and arranged to close the opening and rollers carried by the auxiliary window and arranged to cooperate with said frame rollers for permitting passage of the operator's arm through the window between the rollers.

2. In a detachable vehicle window, a supporting border member, a window glass therein having an opening, a frame bounding said opening, rollers in said frame, an auxiliary window hinged to said frame and rollers on the auxiliary window cooperating with said frame rollers for permitting passage of an operator's arm through the vehicle window between said rollers.

In testimony whereof I affix my signature.

DONALD KERN. [L. S.]